United States Patent Office 2,981,720
Patented Apr. 25, 1961

2,981,720

CHLORINATION AND SULFOCHLORINATION OF LOW-PRESSURE POLYETHYLENE

Horst Herzberg and Ludwig Orthner, Frankfurt am Main, Germany, assignors to Farbwerke Hoechst Aktiengesellschaft vormals Meister Lucius & Brüning, Frankfurt am Main, Germany, a corporation of Germany No Drawing. Filed July 17, 1956, Ser. No. 598,251

Claims priority, application Germany July 28, 1955

12 Claims. (Cl. 260—79.3)

This invention relates to the chlorination and sulfochlorination of low-pressure polyethylene.

It is known to carry through the chlorination or sulfochlorination of ethylene polymers which are prepared according to the high-pressure process. These ethylene polymers prepared according to the high-pressure process are products which dissolve in many solvents at about 60° C. The chlorination or sulfochlorination of these substances has been carried out in solution, in suspension with or without the aid of catalysts or ultra-violet light.

Furthermore, the known process has been carried out in steps while employing varying temperatures. When applying these known processes to polyethylene which has been prepared according to the low-pressure process, for example according to the Belgian Patents Nos. 533,362, 534,792, 534,888, it is found that, at a temperature of below 100° C., the polymers undergo at first only a superficial chlorination owing to the insolubility of the low-pressure polyethylene in the corresponding solvents. These products do not dissolve unless they have a high content of chlorine; however, no uniform reaction products are obtained thereby.

Now we have found a process for producing polyethylenes containing chlorine or chlorine and sulfochloride groups, wherein low-pressure polyethylenes prepared, for example, according to the Belgian Patents Nos. 533,362, 534,792, 534,888, are chlorinated to a small extent at first under pressure at temperatures ranging from 100° C. to 160° C., preferably from 105° C. to 115° C., in chlorinated hydrocarbons which boil below 100° C., and the chlorination is continued under normal pressure and at temperatures ranging from $+20°$ C. to $+80°$ C. in the presence of chlorine or chlorine and sulfur dioxide to obtain polyethylenes having the desired content of chlorine or chlorine and sulfochloride. As solvents suitable for use in the process of this invention there are mentioned methylenechloride, chloroform, trichloroethylene, preferably carbon tetrachloride.

It is surprising that the process of this invention allows of obtaining an increase in the solubility during the first stage of the chlorination of the aforementioned polyethylenes by the introduction of a relatively small quantity of chlorine (5 to 10 percent calculated on the polymer), whereby it is possible to prepare the desired chlorinated or chlorinated and sulfochlorinated polyethylenes in a homogeneous solution at a corresponding reaction temperature.

The chlorination to a small extent by pressure can be carried out either by heating the low-pressure polymer of the ethylene in an autoclave together with a carbon tetrachloride solution saturated with chlorine to a temperature ranging from 105° C. to 110° C. which is maintained for some time, during which operation a pressure of from 2 to 30 atmospheres arises depending on the quantity of the chlorine applied; alternatively, chlorine can be pressed into the closed autoclave which contains a suspension of low-pressure polymers of the ethylene in carbon tetrachloride, without initial formation of pressure since the chlorine is immediately dissolved in carbon tetrachloride. Pressures ranging from 4 to 150 atmospheres arise only if the solution is subsequently heated to temperatures ranging from 105° C. to 150° C. According to the last-mentioned process, the chlorine can also be pressed into the suspension in portions at elevated temperatures during the reaction while care has to be taken that the resulting hydrochloric acid can escape through a regulating valve.

The process claimed can also be applied to polyethylenes of other origin which are insoluble in these solvents at a temperature of 100° C. If, according to this process, chlorine has at least been introduced into the polymer in an amount such that the resulting reaction product is soluble in carbon tetrachloride—which is the case with a chlorine content of at least 5 to 10 percent—the reaction mixture is allowed to cool and released. The solution of the polymer which has been chlorinated to a small extent is then conveyed to a vessel with stirrer in which the chlorination or chlorination and sulfochlorination is terminated under atmospheric pressure and at room or elevated temperatures until the desired chlorine or chlorine and sulfur content is obtained. In this manner a better utilization of the autoclave is assured and, moreover, a liquefaction of the gaseous reactants is prevented during the sulfochlorination. Both stages can be accelerated by thermal and catalytical means (for example by ultra-violet light, azo catalyst and peroxides). It is understood that the process of the present invention extends also to the treatment of polyethylenes of different molecular weights. The polyethylenes obtained according to the process of the invention, which contain chlorine or chlorine and sulfur, are raw materials for producing lacquers and synthetic rubbers.

The macromolecular substances prepared according to the process of the invention, which contain chlorine or chlorine and sulfur, are new since the low-pressure polyethylenes employed as starting materials have a structure and, consequently, display properties which were hitherto unknown in macromolecular substances.

The following examples serve to illustrate the invention but they are not intended to limit it thereto:

*Example 1*

60 grams of liquid chlorine are pressed via a charging valve into a suspension of 50 grams of low-pressure polyethylene ($\eta$ spec./c. 1.12) in 500 ml. of carbon tetrachloride which is in a closed autoclave. While stirring, the suspension is heated to temperatures ranging from 105° C. to 115° C. After 2 hours, the suspension is allowed to cool, then released, and the solution of the polyethylene which has been chlorinated to a small extent is filled into a second reaction vessel provided with gas inlet and outlet tubes. After the addition of 0.05 gram of trimeric acetone peroxide, 65 grams of gaseous chlorine are introduced into the solution at a rate of 20 grams per hour. The reaction temperature is kept at 50° C. After the reaction product has been degassed with nitrogen, it is freed from the solvent by the introduction of steam, dried and ground. The powder thus obtained is soluble in chlorinated and aromatic hydrocarbons. The yield amounts to 102 grams, the chlorine content to 52 percent.

*Example 2*

A suspension which consists of 25 grams of low-pressure polyethylene ($\eta$ spec./c. 1.12), 0.01 gram of azo-iso butyronitrile, 500 ml. of carbon tetrachloride and 15 grams of chlorine is heated in an autoclave to temperatures ranging from 105° C. to 115° C. After 30 minutes, the suspension is allowed to cool and the solution of the polyethylene which has been chlorinated to a small extent is filled into a second vessel provided with inlet tubes for $SO_2$ and $Cl_2$. While adding continuously a further 0.02 gram of azo-iso butyronitrile, 10 grams of chlorine are introduced at a rate of 0.16 gram/minute, and the viscous solution is then gassed with gaseous sulfur dioxide (0.14 gram/minute) and chlorine (0.15 gram/minute) for one hour at a temperature of 30° C.

By introducing nitrogen, the reaction product is liberated from the dissolved gases, precipitated with methanol and finally dried in vacuo at 1 mm. 43 grams of a white, rubber-elastic product are obtained having a content of 28 percent of chlorine, of which 1.9 percent are mobile chlorine and 2.1 percent are sulfur.

We claim:
1. A novel process of chlorinating polyethylene having a molecular weight above 50,000, a melting point of at least 130° C., a crystallinity of at least 80%, containing less than three methyl groups per 100 methylene groups, and being insoluble in chlorinated hydrocarbons at temperatures below 100° C., said polyethylene being prepared by polymerizing ethylene in the presence of a catalytic amount of a heavy metal compound of subgroups IV-VI of the periodic table and a metallo-organic compound, said novel process comprising the steps of first contacting said polyethylene with chlorine under elevated pressure at a temperature of 100-160° C. in a chlorinated hydrocarbon having a boiling point below 100° C. to form a homogeneous solution of partially chlorinated polyethylene, the latter having a chlorine content of 5-10% by weight, cooling said solution to a temperature within the range of 20-80° C., and then introducing additional chlorine into said solution under atmospheric pressure while maintaining the temperature within said range of 20-80° C. until chlorination of the polyethylene is completed.

2. Process of claim 1 wherein said chlorinated hydrocarbon is $CCl_4$.

3. Process of claim 1 wherein the first chlorination step is conducted at a temperature of 105-115° C.

4. Process of claim 1 wherein the chlorination is accelerated by contacting said reactants with trimeric acetone peroxide in an amount of 0.1% by weight, based on the weight of the polyethylene.

5. Process of claim 1 wherein the polyethylene is chlorinated to a final chlorine content of 52% by weight.

6. A novel process of chlorinating polyethylene having a molecular weight above 50,000, a melting point of at least 130° C., a crystallinity of at least 80%, containing less than three methyl groups per 100 methylene groups, and being insoluble in chlorinated hydrocarbons at temperatures below 100° C., said polyethylene being prepared by polymerizing ethylene in the presence of a catalytic amount of a heavy metal compound of subgroups IV-VI of the periodic table and a metallo-organic compound, said novel process comprising the steps of first contacting said polyethylene with chlorine under elevated pressure at a temperature of 100-160° C. in a chlorinated hydrocarbon selected from the group consisting of $CCl_4$, chloroform, trichloroethylene and methylene chloride, to form a homogeneous solution of partially chlorinated polyethylene, the latter having a chlorine content of 5-10% by weight, cooling said solution to a temperature within the range of 20-80° C., and then introducing additional chlorine into said solution under atmospheric pressure while maintaining the temperature within said range of 20-80° C. until chlorination of the polyethylene is completed.

7. A novel process of sulfochlorinating polyethylene having a molecular weight above 50,000, a melting point of at least 130° C., a crystallinity of at least 80%, containing less than three methyl groups per 100 methylene groups, and being insoluble in chlorinated hydrocarbons at temperatures below 100° C., said polyethylene being prepared by polymerizing ethylene in the presence of a catalytic amount of a heavy metal compound of subgroups IV-VI of the periodic table and a metallo-organic compound, said novel process comprising the steps of first contacting said polyethylene with chlorine under elevated pressure at a temperature of 100-160° C. in a chlorinated hydrocarbon having a boiling point below 100° C. to form a homogeneous solution of partially chlorinated polyethylene, the latter having a chlorine content of 5-10% by weight, cooling said solution to a temperature within the range of 20-80° C., and then introducing sulfur dioxide and chlorine into said solution under atmospheric pressure while maintaining the temperature within said range of 20-80° C. until sulfochlorination of the polyethylene is completed.

8. Process of claim 7 wherein said chlorinated hydrocarbon is $CCl_4$.

9. Process of claim 7 wherein the first chlorination step is conducted at a temperature of 105-115° C.

10. Process of claim 7 wherein 28% of chlorine and 2.1% of sulfur are combined with said polyethylene.

11. Process of claim 7 wherein the introduction of chlorine and sulfur is accelerated by the addition of 0.04% of azo-isobutyronitrile, based on the weight of polyethylene.

12. A novel process of sulfo-chlorinating polyethylene having a molecular weight above 50,000, a melting point of at least 130° C., a crystallinity of at least 80%, containing less than three methyl groups per 100 methylene groups, and being insoluble in chlorinated hydrocarbons at temperatures below 100° C., said polyethylene being prepared by polymerizing ethylene in the presence of a catalytic amount of a heavy metal compound of subgroups IV-VI of the periodic table and a metallo-organic compound, said novel process comprising the steps of first contacting said polyethylene with chlorine under elevated pressure at a temperature of 100-160° C. in a chlorinated hydrocarbon selected from the group consisting of $CCl_4$, chloroform, trichloroethylene and methylene chloride, to form a homogeneous solution of partially chlorinated polyethylene, the latter having a chlorine content of 5-10% by weight, cooling said solution to a temperature within the range of 20-80° C., and then introducing sulfur dioxide and chlorine into said solution under atmospheric pressure while maintaining the temperature within said range of 20-80° C. until sulfochlorination of the polyethylene is completed.

References Cited in the file of this patent

UNITED STATES PATENTS

| | | |
|---|---|---|
| 2,398,803 | Myles | Apr. 23, 1946 |
| 2,692,257 | Zletz | Oct. 19, 1954 |
| 2,710,854 | Seelig | June 14, 1955 |
| 2,816,883 | Larchar | Dec. 17, 1957 |
| 2,920,064 | Baptist et al. | Jan. 5, 1960 |

FOREIGN PATENTS

| | | |
|---|---|---|
| 533,362 | Belgium | May 16, 1955 |